Sept. 20, 1932.  C. L. BAUSCH  1,878,366
OPHTHALMIC MOUNTING AND METHOD OF MAKING SAME
Filed June 25, 1932
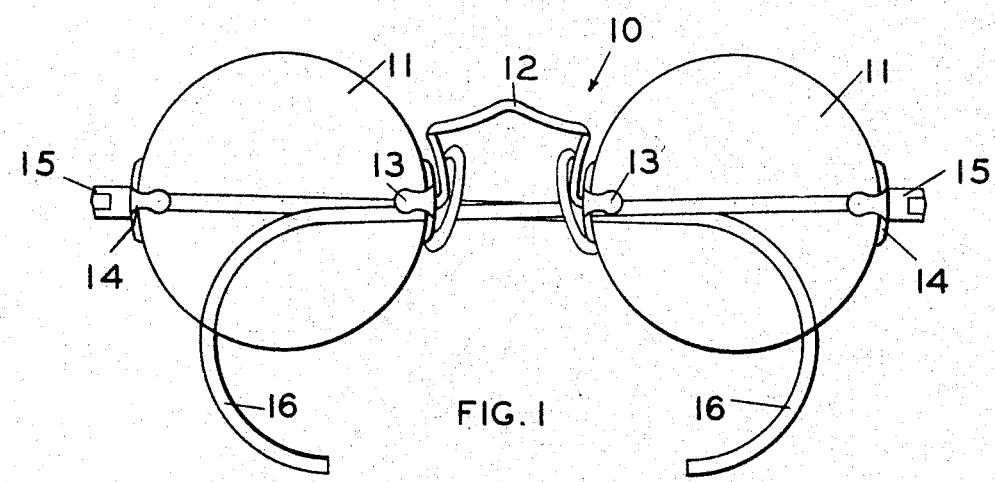
FIG. 1
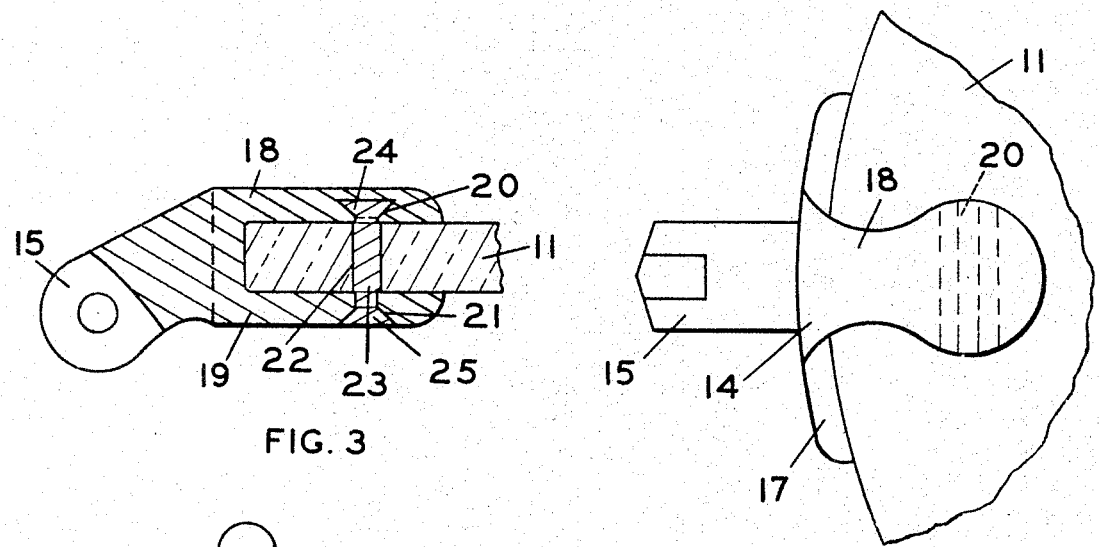
FIG. 3
FIG. 2
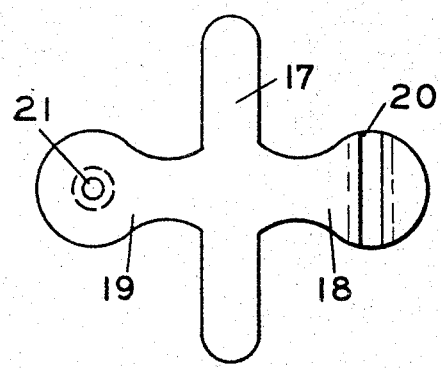
FIG. 4
CARL L. BAUSCH
INVENTOR
BY G.A. Ellestad
ATTORNEY Patented Sept. 20, 1932

1,878,366

UNITED STATES PATENT OFFICE

CARL L. BAUSCH, OF ROCHESTER, NEW YORK, ASSIGNOR TO BAUSCH & LOMB OPTICAL COMPANY, OF ROCHESTER, NEW YORK, A CORPORATION OF NEW YORK

OPHTHALMIC MOUNTING AND METHOD OF MAKING SAME

Application filed June 25, 1932. Serial No. 619,306.

This invention relates to ophthalmic mountings and more particularly it has reference to a method and means for attaching rimless mountings to lenses.

One of the objects of my invention is to provide an improved ophthalmic mounting and method of attaching same to a lens. Another object is to provide an ophthalmic mounting having a lens strap which is neat in appearance and adapted to be readily attached to a lens without the use of a screw. A further object is to provide an ophthalmic mounting having an imperforate lens strap provided with an undercut recess on its inner face whereby the mounting may be secured to a lens by anchoring a retaining element in said recess. These and other objects and advantages reside in certain novel features of construction, arrangement and combination of parts and in the method of constructing and arranging same as will hereinafter be more fully described and pointed out in the appended claims.

Referring to the drawing:

Fig. 1 is a front elevation of a pair of spectacles embodying my invention.

Fig. 2 is an enlarged fragmentary view of my improved lens strap.

Fig. 3 is a sectional view of same.

Fig. 4 is a top plan view of a blank before it is formed up into my strap.

One embodiment of my invention is shown on the drawing wherein 10 indicates a pair of rimless spectacles having the lenses 11 connected by a bridge 12 provided with lens clamps 13. Attached to the lenses by clamps 14 are the end pieces 15 on which are pivotally mounted the temples 16. The clamp 14 comprises a shoe 17 which contacts with the edge of the lens and the two spaced straps 18 and 19 which contact, respectively, with opposite faces of the lens.

The strap 18 is imperforate and has an undercut recess 20 which is milled or otherwise formed on the inner face of the strap. The strap 19 has a countersunk aperture 21. The mounting is positioned on the lens with the aperture 21 opposite the opening 22 in lens 11. A fusible retaining element 23 is then inserted in the aperture 21 and opening 22 and heat and pressure applied so as to force the fused material of the element 23 to fill the recess 20 and the opening and aperture, after which the element is allowed to cool. The mounting is thereby securely attached to the lens by the retaining element which has a portion 24 anchored in the recess and an enlarged head portion 25 in the countersunk opening.

The retaining element 23 is preferably formed of a pyroxylin material which is sold under the trade-mark "Lumarith." I can also use zylonite or other suitable substances such as phenolic resin materials. Such substances can be softened readily and rendered plastic by a reasonable amount of heat. The retaining element should preferably be formed of a material whose softening point is above the boiling point of water so that the cleansing of the spectacles in hot solutions would not loosen the mounted lenses. The mounting can be readily removed by applying sufficient heat to cause the element to melt and run out of the opening and aperture. A new element will, of course, be necessary for remounting the lens.

My improved strap provides an efficient, neat-appearing means for attaching mountings to lenses. The bother and disadvantages of loose screws are eliminated since no screw is used for attaching the mounting. The front surface of the strap 18 can be suitably engraved or ornamented so that the spectacles will present a neat, pleasing appearance when worn. Various modifications can obviously be made without departing from the spirit of my invention.

I claim:

1. An ophthalmic mounting comprising a member having two spaced straps positioned on opposite faces of a lens having an opening, one of said straps being imperforate and having an undercut recess, the other strap having an aperture, and a nonmetallic retaining element positioned in said aperture and opening and having a portion anchored in said undercut recess.

2. An ophthalmic mounting having in combination a lens strap positioned on the surface of a lens having an opening, said strap having an undercut recess on its inner side and a retaining element positioned in and substantially filling said opening, said element being in contact with substantially the entire wall of said opening and having an enlarged head seated in said recess.

3. An ophthalmic mounting comprising a member having two spaced straps positioned on opposite surfaces of a lens having an opening, one of said straps being imperforate and having a recessed portion on its inner face, the other of said straps having an aperture, and a retaining element positioned in said aperture and opening, said element having an enlarged head portion seated in said recessed portion.

4. An ophthalmic mounting comprising a member having two spaced straps positioned on opposite surfaces of a lens having an opening, one of said straps being imperforate and having a recess on its inner side, said recess being opposite said opening, the other strap having an aperture opposite said opening, and a nonmetallic retaining element positioned in said opening and aperture and having a portion anchored in said recess.

5. The method of making an ophthalmic mounting which comprises forming an imperforate strap on a member, forming an undercut recess on the inner face of the strap, positioning said strap on the surface of a lens having an opening, inserting a fusible retaining element in said opening and applying heat and pressure to said element to cause it to fill said opening and recess and thereby secure the mounting to the lens.

6. The method of attaching an ophthalmic mounting to a lens having an opening which comprises the steps of forming two spaced straps on said mounting adapted to contact with opposite surfaces of said lens adjacent said opening, forming an undercut recess on the inner face of one of said straps, forming an aperture in the other strap, inserting a fusible retaining element in said aperture and opening and anchoring said element in said recess by applying heat and pressure.

7. An ophthalmic mounting comprising a member having two spaced straps positioned, respectively, on opposite faces of a lens having an opening, the strap on the front face of the lens being imperforate and having on its inner side a recess provided with a mouth which is narrower than the body of the recess, the other strap having an aperture, and fusible retaining means positioned in said opening and aperture and having an enlarged head seated in said recess.

CARL L. BAUSCH.